US012480993B2

(12) United States Patent
Jain et al.

(10) Patent No.: US 12,480,993 B2
(45) Date of Patent: Nov. 25, 2025

(54) LOW PIN COUNT SCAN WITH NO DEDICATED SCAN ENABLE PIN

(71) Applicant: STMicroelectronics International N.V., Geneva (CH)

(72) Inventors: Sandeep Jain, Noida (IN); Shalini Pathak, Gurgaon (IN)

(73) Assignee: STMicroelectronics International N.V., Geneva (CH)

(*) Notice: Subject to any disclaimer, the term of this patent is extended or adjusted under 35 U.S.C. 154(b) by 57 days.

(21) Appl. No.: 18/608,711

(22) Filed: Mar. 18, 2024

(65) Prior Publication Data

US 2025/0290980 A1    Sep. 18, 2025

(51) Int. Cl.
| | | |
|---|---|---|
| G01R 31/3185 | (2006.01) | |
| G01R 31/3181 | (2006.01) | |
| G06F 30/30 | (2020.01) | |
| G06F 30/33 | (2020.01) | |

(52) U.S. Cl.
CPC .......... *G01R 31/318536* (2013.01); *G01R 31/31813* (2013.01); *G01R 31/318541* (2013.01); *G01R 31/318547* (2013.01); *G01R 31/318566* (2013.01); *G06F 30/30* (2020.01); *G06F 30/33* (2020.01)

(58) Field of Classification Search
CPC ...... G01R 31/318536; G01R 31/31813; G01R 31/318541; G01R 31/318547; G01R 31/318566; G06F 30/30; G06F 30/33
See application file for complete search history.

(56) References Cited

U.S. PATENT DOCUMENTS

| | | |
|---|---|---|
| 6,106,568 A | 8/2000 | Beausang |
| 6,865,704 B2 | 3/2005 | Whannel |
| 7,032,148 B2 | 4/2006 | Wang et al. |
| 7,343,536 B2 | 3/2008 | Han |
| 7,412,672 B1 | 8/2008 | Wang et al. |
| 7,673,208 B2 | 3/2010 | Seuring |
| 7,689,884 B2 | 3/2010 | Seuring |
| 7,739,568 B1 * | 6/2010 | Bertanzetti .... G01R 31/318547 714/814 |

(Continued)

OTHER PUBLICATIONS

L.-T. Wang et al., "VirtualScan: Test Compression Technology Using Combinational Logic and One-Pass ATPG," in IEEE Design & Test of Computers, vol. 25, No. 2, pp. 122-130, Mar.-Apr. 2008 (Year: 2008).*

(Continued)

*Primary Examiner* — Cynthia Britt
(74) *Attorney, Agent, or Firm* — Slater Matsil LLP (57) ABSTRACT

According to an embodiment, a method for testing using scan chains, without an independent scan enable pin, is proposed. The method includes selectively indicating a capture phase and a load/unload phase for the scan chain based on an encoding of a scan enable signal in an expected signal and a masking signal; loading test parameters to the scan chain during the load/unload phase; operating the scan chain under functional mode during the capture phase; and generating an error signal based on comparing an output of the scan chain during an unload phase with the expected signal, wherein the masking signal is used to mask the output of the scan chain for cycles with invalid results.

20 Claims, 7 Drawing Sheets

(56) References Cited

U.S. PATENT DOCUMENTS

| | | | |
|---|---|---|---|
| 7,761,759 B2 * | 7/2010 | Yamazaki | G01R 31/318555 714/731 |
| 7,779,323 B2 * | 8/2010 | Wang | G06F 30/33 714/732 |
| 7,913,137 B2 | 3/2011 | Mukherjee et al. | |
| 8,250,420 B2 | 8/2012 | Hapke et al. | |
| 8,418,007 B2 | 4/2013 | Mukherjee et al. | |
| 8,650,524 B1 | 2/2014 | Chakravadhanula | |
| 8,914,694 B2 | 12/2014 | Mukherjee et al. | |
| 9,091,729 B2 | 7/2015 | Narayanan et al. | |
| 9,250,287 B2 | 2/2016 | Mukherjee et al. | |
| 9,355,203 B2 | 5/2016 | Douskey et al. | |
| 9,766,289 B2 | 9/2017 | Parasrampuria et al. | |
| 10,031,181 B1 | 7/2018 | Solt | |
| 10,591,540 B2 | 3/2020 | Narayanan et al. | |
| 11,782,092 B1 | 10/2023 | Jain et al. | |
| 2005/0060625 A1 | 3/2005 | Wang et al. | |
| 2007/0162803 A1 | 7/2007 | Dervisoglu | |
| 2008/0148117 A1 | 6/2008 | Seuring | |
| 2008/0195346 A1 * | 8/2008 | Lin | G01R 31/318575 702/120 |
| 2010/0090706 A1 | 4/2010 | Malach et al. | |
| 2010/0169856 A1 | 7/2010 | Hom et al. | |
| 2010/0269002 A1 | 10/2010 | Paglieri | |
| 2013/0268818 A1 * | 10/2013 | Wang | G01R 31/31704 714/728 |
| 2013/0305106 A1 | 11/2013 | Mittal | |
| 2014/0032986 A1 | 1/2014 | Wan et al. | |
| 2015/0006987 A1 | 1/2015 | Narayanan et al. | |
| 2015/0185285 A1 | 7/2015 | Kovalev et al. | |
| 2015/0338461 A1 | 11/2015 | Wang et al. | |
| 2017/0097388 A1 | 4/2017 | Parasrampuria et al. | |
| 2017/0193154 A1 * | 7/2017 | Sul | G01R 31/318364 |
| 2020/0333397 A1 | 10/2020 | Kawoosa | |
| 2020/0341057 A1 | 10/2020 | Cheng | |
| 2022/0308110 A1 | 9/2022 | Liu et al. | |
| 2023/0375617 A1 | 11/2023 | Jain et al. | |

OTHER PUBLICATIONS

Chandra, Anshuman et al., "Interval Based X-masking for Scan Compression Architectures," 9th International Symposium on Quality Electronic Design, 2008, IEEE, pp. 821-826. (Year: 2008).

Liu, Yingdi et al., "X-Tolerant Tunable Compactor for In-System Test," 2020, IEEE, International Test Conference, pp. 1-10, Year: 2020.

Rabenalt, Thomas et al., "Masking of X-values by Use of a Hierarchically Configurable Register," 2009 European Test Symposium, IEEE, pp. 149-154, Year: 2009.

Tyszer, Jerzy et al., "X-Tolerant Compactor with On-Chip Registration and Signature-Based Diagnosis," 2007, IEEE, pp. 476-485. Year: 2007.

Extended European Search Report, EP Application No. 25160071.4, mailed Aug. 7, 2025, 8 pages.

Rajesh, Mittal et al: "DFT for Extremely Low Cost Test of Mixed Signal Socs with Integrated RF and Power Management", International Test Conference (ITC), 2011 IEEE International, IEEE, Sep. 20, 2011, 10 pages.

* cited by examiner

| STATES | SCAN_OUT VALUES | | | ENCODED DATA LOADED THROUGH RECONFIGURED SCAN PINS AS INPUTS | | | | |
|---|---|---|---|---|---|---|---|---|
| | $SO_2$ | $SO_1$ | $SO_0$ | $RSI_0$ | $RSI_1$ | $RSI_2$ | $RSI_3$ | $RSI_4$ |
| 0 | 0 | 0 | 0 | 0 | 0 | 0 | 0 | 0 |
| 1 | 0 | 0 | 1 | 0 | 0 | 0 | 0 | 1 |
| 2 | 0 | 0 | M | 0 | 0 | 0 | 1 | 0 |
| 3 | 0 | 1 | 0 | 0 | 0 | 0 | 1 | 1 |
| 4 | 0 | 1 | 1 | 0 | 0 | 1 | 0 | 0 |
| 5 | 0 | 1 | M | 0 | 0 | 1 | 0 | 1 |
| 6 | 0 | M | 0 | 0 | 0 | 1 | 1 | 0 |
| 7 | 0 | M | 1 | 0 | 0 | 1 | 1 | 1 |
| 8 | 0 | M | M | 0 | 1 | 0 | 0 | 0 |
| 9 | 1 | 0 | 0 | 0 | 1 | 0 | 0 | 1 |
| 10 | 1 | 0 | 1 | 0 | 1 | 0 | 1 | 0 |
| 11 | 1 | 0 | M | 0 | 1 | 0 | 1 | 1 |
| 12 | 1 | 1 | 0 | 0 | 1 | 1 | 0 | 0 |
| 13 | 1 | 1 | 1 | 0 | 1 | 1 | 0 | 1 |
| 14 | 1 | 1 | M | 0 | 1 | 1 | 1 | 0 |
| 15 | 1 | M | 0 | 0 | 1 | 1 | 1 | 1 |
| 16 | 1 | M | 1 | 1 | 0 | 0 | 0 | 0 |
| 17 | 1 | M | M | 1 | 0 | 0 | 0 | 1 |
| 18 | M | 0 | 0 | 1 | 0 | 0 | 1 | 0 |
| 19 | M | 0 | 1 | 1 | 0 | 0 | 1 | 1 |
| 20 | M | 0 | M | 1 | 0 | 1 | 0 | 0 |
| 21 | M | 1 | 0 | 1 | 0 | 1 | 0 | 1 |
| 22 | M | 1 | 1 | 1 | 0 | 1 | 1 | 0 |
| 23 | M | 1 | M | 1 | 0 | 1 | 1 | 1 |
| 24 | M | M | 0 | 1 | 1 | 0 | 0 | 0 |
| 25 | M | M | 1 | 1 | 1 | 0 | 0 | 1 |
| 26 | M | M | M | 1 | 1 | 0 | 1 | 0 |
| 27 | UNUSED STATES | | | 1 | 1 | 0 | 1 | 1 |
| 28 | | | | 1 | 1 | 1 | 0 | 0 |
| 29 | | | | 1 | 1 | 1 | 0 | 1 |
| 30 | | | | 1 | 1 | 1 | 1 | 0 |
| 31 | | | | 1 | 1 | 1 | 1 | 1 |

LOW PIN COUNT SCAN WITH NO DEDICATED SCAN ENABLE PIN

TECHNICAL FIELD

The present disclosure generally relates to design for testing (DFT) and, in particular embodiments, to a DFT device, circuit, and method of operation with a low pin count scan and no dedicated scan enable pin.

BACKGROUND

Integrated circuits (ICs) are generally tested for faults. In particular, the logic circuits of the integrated circuit are commonly tested using a method often referred to as scan testing. During scan testing, test patterns are shifted in through one or more chains of flip-flops (i.e., scan chains) to stimulate one or more logic circuits. Results from the stimulated logic circuits are loaded into the scan chains and are shifted out for evaluation. When the shifted-out patterns match expected patterns (based on the proper functioning of one or more logic circuits), no faults are detected, and the circuit may be defect-free. Faults are detected when the shifted-out patterns do not match the expected patterns.

Achieving higher scan compression is central in integrated circuit (IC) testing. This goal is becoming increasingly important as it directly impacts the cost of testing and, consequently, the profitability of IC designs. Scan compression techniques allow for testing more of an IC's functionality with fewer test vectors. As the complexity and density of ICs continue to grow, the volume of test data required to ensure quality and reliability also increases. This presents a challenge in storing the test data and the time required to apply the tests. Higher scan compression addresses this challenge by reducing the amount of test data needed, which can significantly lower the test application time and test data volume. This reduction in test time and data directly translates into cost savings, as using less time on automatic test equipment (ATE) lowers the cost per chip, thus enhancing overall design revenues by enabling a higher throughput in manufacturing.

With the advent of new technologies and applications, such as those found within the automotive industry, there has been a surge in multi-site testing requirements. Multi-site testing enables the parallel testing of several devices or dies simultaneously, enhancing throughput and efficiency. This approach is especially beneficial when producing high volumes of automotive-related chips, which require stringent quality standards due to their critical safety applications. However, multi-site testing demands that a large volume of scan data be delivered to multiple dies simultaneously without compromising speed or reliability. Alongside this challenge, new fault models have arisen due to the increasing complexity of automotive electronics and the demand for high reliability, resulting in an even greater explosion of test data volume. Thus, multi-site testing requirements and new fault models in automotive applications are driving the need for enhanced scan compression solutions that can handle the drastically increasing scan volumes.

Given these challenges, it is advantageous to have solutions to manage and alleviate lengthy test application times without sacrificing test coverage or fault detection capabilities to meet the growing testing demands and maintain the integrity and reliability of complex systems in safety-critical sectors such as automotive electronics.

SUMMARY

Technical advantages are generally achieved by embodiments of this disclosure, which describe a design for testing (DFT) device, circuit, and method of operation with a low pin count scan and no dedicated scan enable pin.

A first aspect relates to a method for testing using scan chains, without an independent scan enable pin. The method includes selectively indicating a capture phase and a load/unload phase for the scan chain based on an encoding of a scan enable signal in an expected signal and a masking signal; loading test parameters to the scan chain during the load/unload phase; operating the scan chain under functional mode during the capture phase; and generating an error signal based on comparing an output of the scan chain during an unload phase with the expected signal, wherein the masking signal is used to mask the output of the scan chain for cycles with invalid results.

A second aspect relates to a method for testing using scan chains without an independent scan enable pin. The method includes pre-loading a first number of shift cycles into a shift counter circuit, the first number of shift cycles corresponding to a test pattern set; pre-loading a second number of capture cycles into a capture counter circuit, the second number of capture cycles corresponding to the test pattern set; initiating a load/unload phase of the testing by maintaining an internally generated scan enable signal at a high logic level, wherein the shift counter circuit counts the pre-loaded number of shift cycles; transitioning the internally generated scan enable signal to a logic level in response to a completion of the pre-loaded count by the shift counter circuit, wherein the transitioning initiates a capture phase of the testing; and initiating a subsequent load/unload phase of the testing by transitioning the internally generated scan enable signal to the high logic level in response to a completion of the pre-loaded count by the capture counter circuit.

A third aspect relates to a method for testing using scan chains in a digital circuit without an independent scan enable pin. The method includes specifying a first pin assignment with N input pins and R merged input pins, N and R being integers, N corresponding to a number of input pins for carrying scan-in chain test data, and R corresponding to a number of input pins for carrying a merged expected test result and a masking instruction signal; specifying a second pin assignment with N input pins and M output pins, M being an integer and corresponding to a number of output pins for carrying scan-out chain test data; inserting a comparator circuit and a decoding logic circuit into the digital circuit; generating an N by M codec; integrating the N by M codec and inserting scan chains, wherein device registers are stitched into multiple scan chains and coupled between a compression circuit and a decompression circuit; and decoding an internally generated scan enable signal using one of the $2^R$ states provided by the R merged input pins, wherein $3^N$ states are decoded outputs from the decoding logic circuit.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of design for testing (DFT), it should also be appreciated that these inventive aspects may also apply to other aspects of circuit design. Embodiments of this disclosure apply to combinational and sequential compressions and may be applied to factory testing using, for example, an automatic test pattern generation (ATPG) tool or in-field testing using, for example, a logic built-in self-test (LBIST) controller. In particular, aspects of this disclosure may apply to DC-DC Active-Matrix Organic Light-Emitting Diodes (AMOLED) display drivers, Power Management Integrated Circuit (PMIC), rectifier-type applications, and the like.

The progression of semiconductor technology, particularly in sectors that demand high levels of reliability, such as automotive and medical devices, has led to new fault models that go beyond the traditional stuck-at and transition faults. Sophisticated fault models like Small Delay Defects (SDD) and cell-aware fault models are being developed to capture the nuanced defects that occur at smaller geometries and can significantly impact the performance and reliability of ICs. These contemporary fault models consider variances in manufacturing processes and the subtle interactions between transistors within a cell that could lead to failures. While these advanced fault models provide a higher quality of testing, they also contribute to a substantial increase in scan volume. This is due to generating additional test patterns to cover these finer defects. The resultant expanded scan data must be applied during testing to ensure the IC meets the stringent quality requirements, hence inflating the volume of data that needs to be managed during the test process.

The additional test patterns required for these new fault models directly translate to increased test time per device. Since testing is performed at various stages throughout the manufacturing process and potentially at end-of-line quality checks, the added test time becomes a recurring cost for every device shipped. This impacts the overall cost basis of the ICs and can diminish profit margins, making it imperative for semiconductor companies to seek methods to reduce test time without compromising on quality. Reducing test time can be achieved through more advanced scan compression techniques, improved test equipment, enhanced design-for-testability (DFT) practices, and optimization of test schedules to minimize overhead.

Advantageously, embodiments of this disclosure allow for substantial savings in test costs that manifest in enhanced lifetime revenue for the products. The proposed compression architectures do not sacrifice scan data and are flexible enough to work with existing scan architectures.

In an integrated circuit testing environment constrained by a limited number of external pins (e.g., available at the chip boundary or package), a decompressor is generally used to internally fan out these few input test signals across multiple scan chains, maximizing scan test coverage. An intermediate layer then bridges the gap between the decompressor and a compressor, processing the test data that flows from the expansive network of scan chains.

The intermediate layer may include various functional components such as logic gates, multiplexers, buffers, or any other forms of digital circuitry that facilitate the processing of test data within the scan chains. It can also involve error detection and correction mechanisms, routing of signals, control logic for scan chain selection, or any other related technological functions that support the test infrastructure within the integrated circuit.

The compressor consolidates the responses from these scan chains, compacting them into a few outputs that correspond with the limited external pins. This strategic arrangement allows for extensive internal testing without a direct correlation between the number of scan chains and external pins, optimizing pin utilization during the test phase. Utilizing the previously allotted scan enable pin in the limited number of external pins as an internal test signal reduces the overall scan test volume and improves test compression.

Figure 1:
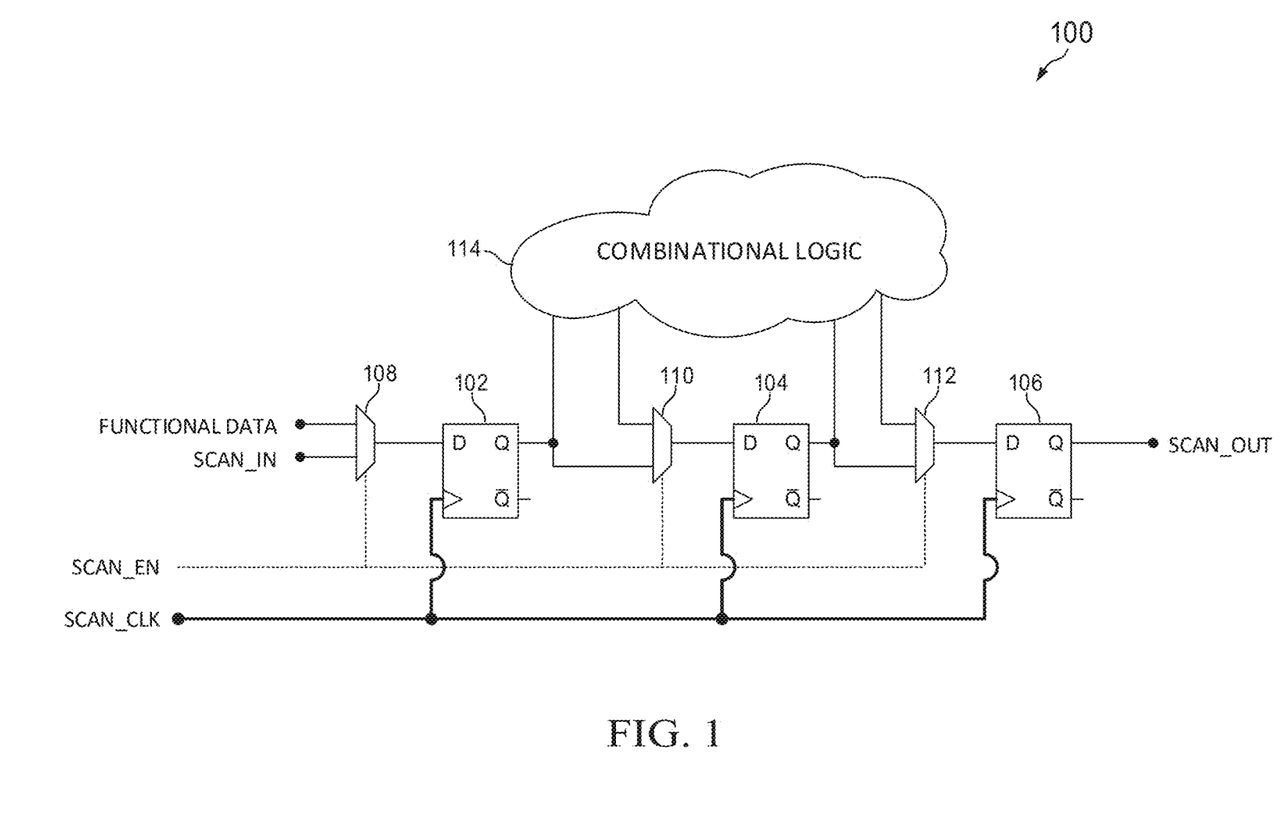
FIG. 1 is a block diagram of an architecture for testing a scan chain.

FIG. 1 illustrates a block diagram of an architecture for testing a scan chain 100 in, for example, a digital circuit. Scan chain 100 includes a first scan flip-flop 102, a second scan flip-flop 104, a third scan flip-flop 106, a first multiplexer 108, a second multiplexer 110, a third multiplexer 112, and a combinational logic 114, which may (or may not) be arranged as shown. Scan flip-flop 100 may include additional components not shown, such as additional scan-flip-flops and an associated multiplexer for each.

The first scan flip-flop 102, the second scan flip-flop 104, and the third scan flip-flop 106 are arranged in the scan chain 100 to test one or more logic components of the combinational logic 114 in the digital circuit using, for example, ATPG techniques.

The data input (D) of the first scan flip-flop 102 is coupled to the output of the first multiplexer 108, the data input (D) of the second scan flip-flop 104 is coupled to the output of the second multiplexer 110, and the data input (D) of the third scan flip-flop 106 is coupled to the output of the third multiplexer 112. The output of the first scan flip-flop 102 and the second scan flip-flop 104 is coupled to the combinational logic 114. Each multiplexer 108, 110, and 112 includes a functional input terminal, a test input terminal, a selection terminal, and an output terminal. The functional input terminal to the second multiplexer 110 and the third multiplexer 112 is coupled to the combinational logic 114.

The value at the selection terminal of each multiplexer 108, 110, and 112 through the scan enable signal (SCAN_EN) determines whether the functional signal or the test input signal (SCAN_IN) is selected at its output. The output signal (SCAN_OUT) of the third scan flip-flop 106 provides the result of the test pattern for the digital circuit during test mode.

A clock signal (SCAN_CLK) is coupled to the clock input of each of the first scan flip-flop 102, the second scan flip-flop 104, and the third scan flip-flop 106. The clock signal controls the operations' timing and synchronizes the data's movement through the scan chain 100. In test mode, the scan chain 100 uses the clock signal to serially shift test data into and out of the scan flip-flops. When the clock signal is applied, the test data moves from one scan flip-flop to the next. In functional mode, the clock signal is used to control the regular operation of the digital circuit, ensuring that data moves through the circuit and that scan flip-flops are synchronized.

The transition from functional mode to test mode and vice versa is achieved by altering the input at the selection terminal of the respective multiplexer through the scan enable signal (SCAN_EN). This provides an efficient mechanism for testing the combinational logic 114 within the digital circuit during regular operation and when undergoing fault detection and diagnosis. The workflow between functional and test modes differs, determined by the logic level of the scan enable signal at the selection terminal of each multiplexer 108, 110, and 112. During functional mode (i.e., when the scan enable signal is de-asserted), multiplexers 108, 110, and 112 select the functional inputs. This allows the digital circuit to operate normally by passing input signals through combinational logic 114 and the scan chain 100. The first scan flip-flop 102, the second scan flip-flop 104, and the third scan flip-flop 106 bring out the functional outputs of the combinational logic 114.

During test mode (i.e., when the scan enable signal is asserted), multiplexers 108, 110, and 112 select the test inputs. A predefined test pattern is fed to the scan chain 100 as the test input signal (SCAN_IN). After the test pattern has been entirely shifted into the scan chain, the clock signal subsequently shifts out the result of the test pattern as the output signal (SCAN_OUT). The outputs of the scan flip-flops 102, 104, and 106, triggered by the clock signal, provide the test data that reflects the status of the combinational logic 114 under test.

During test mode, scan testing is typically conducted in three phases: scan-in, capture, and scan-out. A test pattern is provided to the scan chain during the scan-in phase. The test pattern traverses the scan chain 100, with the third scan flip-flop 106 capturing and storing the output of the scan chain 100. During the scan-out phase, the output signal (SCAN_OUT) is compared to expected values to identify discrepancies, indicating faults or errors in the scan chain 100.

A persistent bottleneck in administering scan tests efficiently is the limited number of available scan pins, which restricts the amount of scan data that can be loaded onto a device per cycle. Given this limitation, IC designers and test engineers are challenged with increasing the volume of scan data that can be fed into and out of the chip within the given test cycles. This constraint often necessitates varying approaches to data compression and scan architecture optimization. Multiplexing techniques, serial scan methodologies, and advancements in on-chip decompression hardware have been explored to maximize the utilization of available pins. Each technique aims to amplify the amount of data passing through each scan pin, allowing for more extensive test coverage while adhering to pin-count constraints. As a result, strategies that allow for higher compaction of test data and more efficient data delivery systems are critical in reducing test times, conserving costs, and ensuring that the devices shipped meet the high-quality standards demanded by advanced applications.

The testing process includes different phases of load, capture, and unload. Each phase corresponds to a different step in the testing process, governed by the state of the scan enable signal. During the load phase, the scan enable signal (SCAN_EN) is set to a high logic level. While in this state, test data is loaded into the scan chains through the SCAN_IN pin. This action prepares the internal flip-flops of the scan chain 100 with specific test data patterns necessary for the upcoming capture phase.

Following test data loading, the system transitions to the capture phase. In this phase, the scan enable signal (SCAN_EN) is set to a low logic level for one or two clock pulses. During this time, the integrated circuit operates in its functional mode-regular operation-capturing functional data within the flip-flops that were previously loaded with test data.

After capturing the functional data, the unload phase commences with the scan enable signal (SCAN_EN) again asserted (i.e., high logic level). The data, which has been captured in the flip-flops, is now serially shifted out to an external pin for analysis. During this shifting process, it's possible to simultaneously load new test data for the next test cycle, optimizing testing efficiency.

Throughout these phases, especially during loading and unloading, the scan enable signal (SCAN_EN) maintains a static or pseudo-static behavior; it stays high during both load and unload phases and drops low only during the capture phase. Its predictability means that it's unnecessary to associate the scan enable signal (SCAN_EN) with varying functionality for different clock cycles.

Accordingly, the scan enable signal (SCAN_EN) is responsible for toggling between the functional and test modes of operation by controlling the state of multiplexers that direct functional signals or test patterns to the scan flip-flops. During the scanning phases—both scan-in and scan-out—the scan enable signal (SCAN_EN) remains static, either constantly active or inactive. Therefore, dedicating an entire pin just for the scan enable signal (SCAN_EN) can lead to inefficient usage, especially given that a pin on an integrated circuit is a resource that adds to design complexity and production cost.

Aspects of this disclosure propose a scan-compression architecture that eliminates the traditional dependency on an external scan enable (SE) pin feeding the scan enable signal (SCAN_EN) from an external device or circuit. In embodiments, the approach involves internally (i.e., on-chip) decoding the capture window from existing scan-in states, allowing for a more efficient squeeze of device compression within the limited pin count, reducing test costs. The proposed architecture derives an internal scan enable signal (SCAN_EN) without additional pins for automatic test pattern generation (ATPG).

Figure 2:
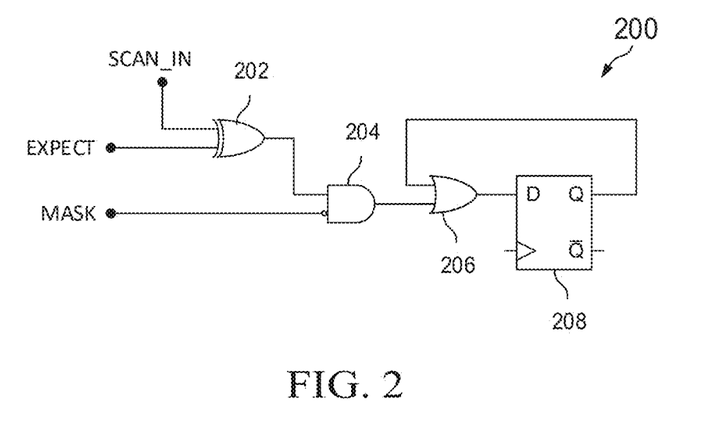
FIG. 2 is a block diagram of an on-chip comparator circuit.

FIG. 2 illustrates a block diagram of an on-chip comparator circuit 200. In embodiments, the on-chip comparator circuit 200 is coupled to the output of the scan chain 100. The on-chip comparator circuit 200 receives the output signal (SCAN_OUT) of, for example, the scan chain 100 (or from a compressor) as a scan input (SCAN_IN). The scan input is compared against an expected signal (EXPECT) to determine if the digital circuit functions correctly. The masking signal (MASK) is used to indicate which cycle the output of the scan chain or compressor should be ignored.

On-chip comparator circuit 200 includes a XOR gate 202, an AND gate 204 with one inverted input, an OR gate 206, and a flip-flop 208, which may (or may not) be arranged as shown. The on-chip comparator circuit 200 may include additional components that are not shown. For example, the on-chip comparator circuit 200 may include an additional OR gate coupled to the output of the AND gate 204 and an accumulator signal to test multiple scan chains with the same circuit.

XOR gate 202 is a digital logic gate with two inputs and one output. It outputs a high logic level signal only when both inputs have different logical values. The first input of the XOR gate 202 is coupled to, for example, the output signal (SCAN_OUT) of the scan chain 100 (or the output of a compressor), while the second input is coupled to the expected signal (EXPECT), which acts as a reference for comparison.

The output of the XOR gate 202 is coupled to the non-inverting input of the AND gate 204. The masking signal (MASK) is provided to the inverting input of the AND gate 204. The AND gate 204 outputs a logic high signal when the output of the XOR gate 202 is at a high logic level, and the masking signal (MASK) is at a low logic level.

The output of the AND gate 204 is coupled to the first input of the OR gate 206. A second input of the OR gate 206 is coupled to the output (Q) of the flip-flop 208. The output of the OR gate 206 is coupled to the input (D) of the flip-flop 208. The output of the OR gate 206 is at a high logic level when at least one of the inputs to the OR gate 206 is at a high logic level.

In embodiments, the flip-flop 208 is a D-type flip-flop. Flip-flop 208 stores the data at its input (D) when a clock pulse occurs. The data stored is available at its output (Q).

The XOR gate 202 compares the output signal (SCAN_OUT) of the scan chain 100 against the expected signal (EXPECT). If both are equal (meaning that both bits are logic low or both are logic high), the XOR gate 202 outputs a logic low signal. It outputs a logic high signal if they differ, indicating a discrepancy.

The AND gate 204 allows certain bits to be masked (ignored) during comparison. When the masking signal (MASK) is at a high logic level, the inverted input becomes a low logic level, enabling the AND gate 204 to pass the output from the XOR gate 202 (indicating a mismatch) through to the OR gate 206. If masking is not desired for a particular bit, the masking signal (MASK) would be at a low logic level, blocking any discrepancy signal from passing through.

The OR gate 206, in conjunction with the flip-flop 208, acts as an accumulator of discrepancies. If any previous discrepancy were detected and stored in the flip-flop 208 (meaning its output (Q) was a high logic level), it would ensure that the output of the OR gate 206 remains at a high logic level even if the current comparison does not show a discrepancy. In this way, any detected errors are captured and stored until they can be dealt with. The output (Q) of the flip-flop 208 is readable through, for example, an Internal Joint Test Action Group (IJTAG) interface as a pass/fail indicator for each scan chain.

The on-chip comparator circuit 200 allows real-time error detection during scan chain testing by comparing each scanned bit with an expected signal and using the masking signal to ignore bits as needed selectively. The accumulation function ensures that even transient errors are captured and not overwritten by subsequent correct comparisons.

The error detection mechanism provided in the on-chip comparator circuit 200 can be summarized using Table I.

TABLE I

| SCAN_IN | EXPECT | MASK |
|---|---|---|
| SSSSSSSS | EEEEEEEE | 00000000 |
| SSSSSSSS | EXEEXEEE | 01001000 |
| SSSSSSSS | XXXXXXXX | 11111111 |

Table I includes three columns. The first column indicates the output of the scan chain 100 or the compressor as the scan input signal (SCAN_IN). The second column indicates the various possible expected signal (EXPECT). The third column indicates the various possible masking signal (MASK). In Table I, eight chains are shown with single cycle data; however, it should be appreciated that the number of chains is non-limiting, and fewer or greater are contemplated in embodiments.

The scan input signal (SCAN_IN) to the on-chip comparator circuit 200 for each scan chain is represented as an 'S,' which can be either high logic level ('1') or low logic level ('0'). The expected signal (EXPECT) is represented as an 'E,' which is either high logic level or low logic level. When the expected signal (EXPECT) is to be ignored for that cycle, the expected signal (EXPECT) is represented as an 'X,' which can be a high logic level or low logic level, without affecting the output of the on-chip comparator circuit 200. The masking signal (MASK) is at a low logic level ('0') when the scan input signal (SCAN_IN) is not to be ignored for that cycle. In contrast, the masking signal (MASK) is at a high logic level ('1') when the scan input signal (SCAN_IN) is to be ignored for that cycle.

The first row corresponds to a case where the scan input signal (SCAN_IN) will be compared with the expected signal (EXPECT) without masking. The third row corresponds to the case where the scan input signal (SCAN_IN) is to be masked (i.e., the outputs of the scan chains are invalid), regardless of whether the expected signal (EXPECT) is a '1' or a '0'. The second row corresponds to a case where a few scan chains are masked (i.e., some scan chains provide an undetermined output and will not be compared to an expected value). The scan input signal (SCAN_IN) will be compared with the expected signal (EXPECT) only when the masking signal (MASK) equals a low logic level. For the second row, the expected signal (EXPECT) can be set to a '1' or '0,' at the cycle where the scan input signal (SCAN_IN) is to be ignored as the masking signal (MASK) is set to a high logic level ('1') for that cycle.

Thus, it is observed that when the scan input signal (SCAN_IN) is to be ignored, the expected signal (EXPECT) becomes redundant, given that the masking signal (MASK) dictates the output of the on-chip comparator circuit 200. Accordingly, it is possible to indicate a capture or load phase by encoding the operation of the scan enable signal (SCAN_EN) using the combination of the expected signal (EXPECT) and the masking signal (MASK).

Table II below indicates a proposed encoding of the scan enable signal (SCAN_EN) within the expected signal (EXPECT) and the masking signal (MASK).

TABLE II

| SCAN_IN | EXPECT | MASK |
|---|---|---|
| SSSSSSSS | EEEEEEEE | 00000000 |
| SSSSSSSS | EXEEXEEE | 01001000 |
| SSSSSSSS | 11111111 | 11111111 |
| SSSSSSSS | 00000000 | 11111111 |

The first two rows of Table II follow the first two rows of Table I. However, the third row of Table I is split into two different classifications in rows three and four of Table II, corresponding to when all the scan input signals (SCAN_IN) are masked.

In the third row of Table II, the expected signal (EXPECT) is set to a high logic level '1' for all scan chains, while the masking signal (MASK) is set to a high logic level '1'. In the fourth row of Table II, the expected signal (EXPECT) is set to a high logic level '0' for all scan chains, while the masking signal (MASK) is set to a high logic level '1'.

In embodiments, setting the expected signal (EXPECT) and the masking signal (MASK) to a high logic level '1' is decoded as the scan enable signal (SCAN_EN) being at a low logic level '0,' indicating the capture phase. In embodiments, setting the expected signal (EXPECT) to a low logic level '0' and the masking signal (MASK) to a high logic level '1' is decoded as the scan enable signal (SCAN_EN) being at a high logic level '1,' indicating the load/unload phase.

In embodiments, setting the expected signal (EXPECT) and the masking signal (MASK) to a high logic level '1' is decoded as the scan enable signal (SCAN_EN) being at a high logic level '1,' indicating the load/unload phase. In embodiments, setting the expected signal (EXPECT) to a low logic level '0' and the masking signal (MASK) to a low logic level '0' is decoded as the scan enable signal (SCAN_EN) being at a high logic level '1,' indicating the capture phase.

Accordingly, by selectively assigning a state to the expected signal (EXPECT) when the masking signal (MASK) is being asserted, one can indicate to the scan chain the capture or load/unload phases without the need for an independent scan enable (SE) pin.

Figure 3:
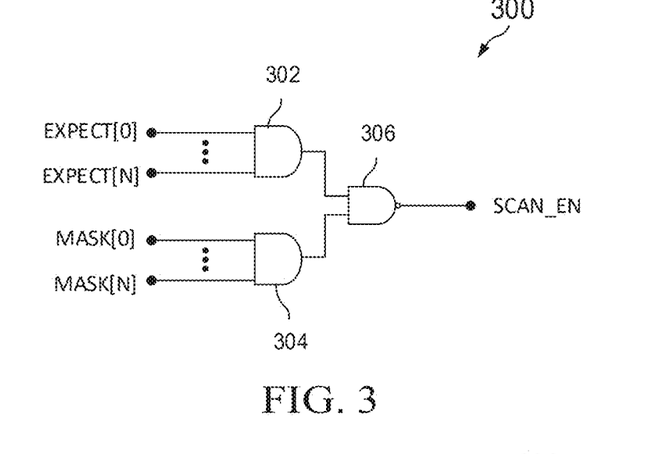
FIG. 3 is a block diagram of an embodiment logic circuit.

FIG. 3 illustrates a block diagram of an embodiment logic circuit 300, which may be implemented to decode the expected signal (EXPECT) and masking signal (MASK) to determine whether the phase corresponds to a capture or load/unload. Logic circuit 300 includes a first AND gate 302, a second AND gate 304, and a NAND gate 306, which may (or may not) be arranged as shown.

The first AND gate 302 is an N input AND gate, where N is an integer greater than one. The value of N corresponds to the number of scan chains tested by the on-chip comparator circuit 200 (i.e., N equals the number of scan chains tested minus one). For example, if the number of scan chains tested by the on-chip comparator circuit 200 is eight, N equals seven. Each input of the N input AND gate of the first AND gate 302 is coupled to an expected input of a corresponding scan chain. The first AND gate 302 is configured to output a high logic level only in response to the expected values being equal to a high logic level. If any input signals to the first AND gate 302 are low logic level, the output of the first AND gate 302 is also low logic level.

The second AND gate 304 is an N input AND gate, where N is an integer greater than one. The value of N corresponds to the number of scan chains tested by the on-chip comparator circuit 200. For example, if the number of scan chains tested by the on-chip comparator circuit 200 is eight, N equals eight. Each input of the N input AND gate of the second AND gate 304 is coupled to a masked input of a corresponding scan chain. The second AND gate 304 is configured to output a high logic level only in response to all masked values being equal to a high logic level. If any of the input signals to the second AND gate 304 is a low logic level, the output of the second AND gate 304 is a low logic level.

The output of the first AND gate 302 and the second AND gate 304 are coupled to a respective input of the NAND gate 306. In response to (i) all of the expected values being equal to a high logic level and (ii) all of the masked values being equal to a high logic level, the output of the NAND gate 306 is a low logic level. Conversely, in response to (i) all of the expected values being equal to a low logic level and (ii) all masked values being equal to a high logic level, the output of the NAND gate 306 is a high logic level. The output of the NAND gate 306 is provided as, for example, the scan enable signal (SCAN_EN) for the scan chain 100.

It should be appreciated that the logic circuit 300 may be implemented using other logic gates. For example, instead of an N input AND gate, the first AND gate 302 may be implemented using a cascade of two input AND gates. Accordingly, as long as the output of the logic circuit 300 provides (i) a low logic level when the expected signal (EXPECT) and the masking signal (MASK) are at a high logic level on all input pins and (ii) a high logic level when the expected signal (EXPECT) is at a low logic level and the masking signal (MASK) is at a high logic level on all input pins, the arrangement of the logic gates may change.

Figure 4:
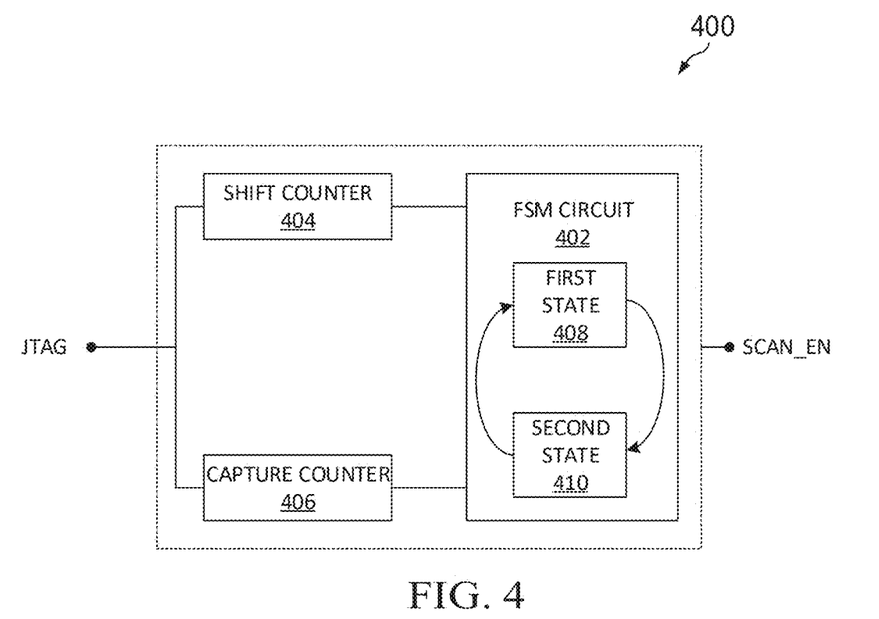
FIG. 4 is a block diagram of an embodiment circuit configured to identify shift and capture phases.

FIG. 4 illustrates a block diagram of an embodiment circuit 400 configured to identify shift and capture phases. In embodiment, circuit 400 includes a finite state machine (FSM) 402 coupled to a shift counter circuit 404 and a capture counter circuit, which may (or may not) be arranged as shown. Circuit 400 may include additional components that are not shown.

The FSM circuit 402 has two states. In a first state 408, the output of the FSM circuit 402 is the scan enable signal (SCAN_EN) with a high logic level. In the second state 410, the output of the FSM circuit 402 is the scan enable signal (SCAN_EN) with a low logic level. The shift counter circuit 404 and the capture counter circuit 406 use a handshaking feature to control the scan enable signal (SCAN_EN) by counting down from a pre-loaded counter value and signaling the end of the counter to the FSM circuit 402.

In embodiments, the shift counter circuit 404 is pre-set with the number of shift cycles for each test pattern. In contrast, the capture counter circuit 406 is responsible for ascertaining the required capture cycles. Both counter circuits, the shift counter circuit 404 and the capture counter circuit 406 collaborate through a handshaking mechanism to manage the scan enable signal (SCAN_EN). Every time a scan process is initiated, the shift counter circuit 404 and the capture counter circuit 406 are pre-loaded with an initial value. Consequently, the counters count for these specified pre-loaded cycles, which prompts them to output either a binary zero or one.

During the load/unload phase, the scan enable signal (SCAN_EN) remains at a high logic level while the shift counter circuit 404 counts to the pre-loaded number. When the shift counter circuit 404 reaches the pre-loaded number, the scan enable signal (SCAN_EN) transitions from the high to a low logic level, beginning the capture phase. The capture counter circuit 406 counts to the pre-loaded number and the scan enable signal (SCAN_EN) remains at a low logic level during this period. When the capture counter circuit 406 reaches the pre-loaded number, the scan enable signal (SCAN_EN) transitions from low to high logic. The process is then repeated for the next load/unload phase.

For example, if the scan chain length is N, the shift counter circuit 404 will maintain the scan enable signal (SCAN_EN) at the high logic level for N cycles during the shift (i.e., load/unload) phase before switching it to a low logic level. Meanwhile, the capture counter circuit 406 will ensure that for M cycles, the scan enable signal (SCAN_EN) remains at a low logic level during the capture phase before switching it to a high logic level once more. When each counter reaches its pre-set limit, it toggles the state of the scan enable signal (SCAN_EN). The test pattern set defines the specific numbers M and N, and since these values are known in advance, they can be loaded directly into the counters. The JTAG interface may serve as the conduit to input these counter values.

The FSM circuit 402 begins in the shift phase at the first state 408, which causes the shift counter circuit 404 to count down or up for the N number of cycles preloaded into the shift counter circuit 404 for that test pattern. When the FSM circuit 402 receives a signal from the shift counter circuit 404 indicating the passage of N cycles, the FSM circuit 402 transitions to the second state 410, which causes the capture counter circuit 406 to count down or up for the M number of cycles preloaded into the capture counter circuit 406 for that test pattern. When the FSM circuit 402 receives a signal from the capture counter circuit 406 indicating the passage of M cycles, the FSM circuit 402 transitions back to the first state 408, and the process is repeated.

Figure 5:
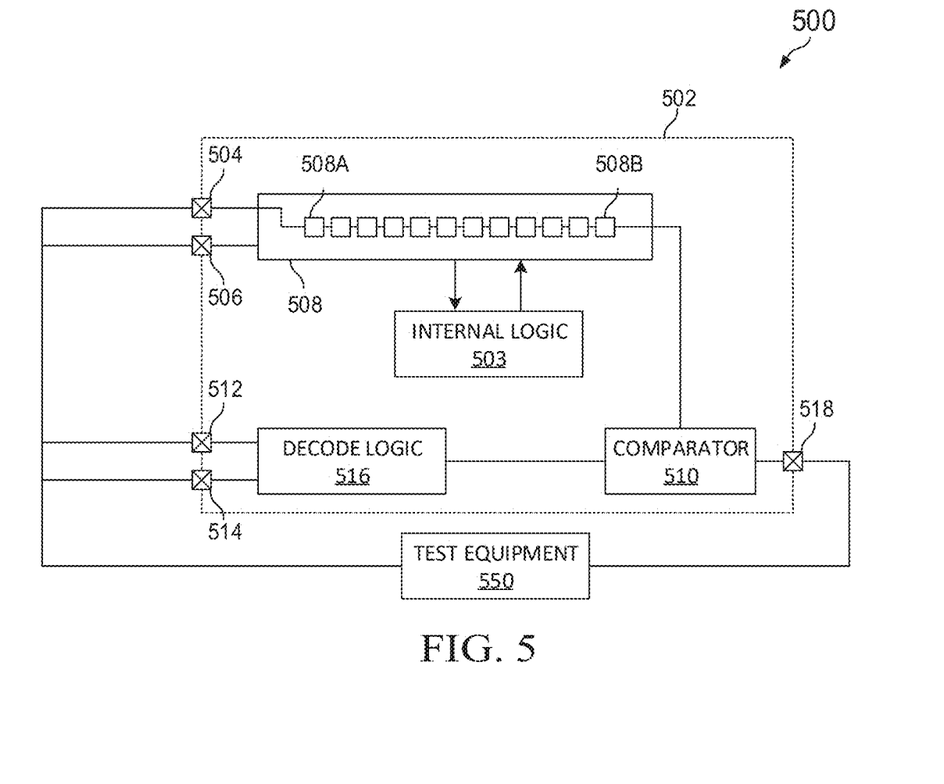
FIG. 5 is a block diagram of an embodiment on-chip comparator circuit.

FIG. 5 illustrates a block diagram of an embodiment on-chip comparator circuit 500. Reference is made to an on-chip comparator circuit as disclosed in U.S. Pat. No. 11,782,092 ("Jain"), incorporated by reference herein in its entirety.

In embodiments, Jain discloses an efficient communication and processing of test data to facilitate on-chip testing, potentially minimizing the pin count required for testing by merging signals and selectively comparing or masking test data as needed.

The process involves the digital circuit receiving multiple chains of test data (N scan-in chains) from the off-chip equipment and utilizing this data to conduct tests that generate results. A merged signal containing both expected test results and masking instructions is sent to fewer pins (X pins) on the chip than the number of test chains. This merged signal is decoded into individual outputs matching each test chain, then compared with actual test results using the comparator or masked as instructed.

The method is refined to include decompression of scan-in chains, serial loading of test registers with data derived from the chains, storage of test results in test registers, and compression of test results into N chains of outputs. Additionally, the calculation of X based on the number of test chains is specified, using single-bit output for comparison results and on-chip storage of comparison results with outputs after a set number of comparisons.

The digital circuit includes input pins that receive test data, test registers, decoding logic for the merged signal, and an on-chip comparator for comparison and masking actions. Additional components include logic for decompressing and compressing test data, memory for storing comparison results, and output for relaying these results, which may consist of a single bit.

The on-chip comparator circuit 500 may include a digital circuit 502 or an electronic device. As will be appreciated, it may be advantageous to perform various functionality, performance, quality, or stress tests for the digital circuit 502. Testing may be performed with off-chip testing equipment 550 (or off-device), such as automated test equipment (ATE) using, for example, input pins. A first input pin 504 may receive a first scan-in chain. As will be appreciated, various embodiments may include more input pins. Additional input pins may receive additional scan-in chains from off-chip testing equipment 550. The more pins utilized for inputting data, the more scan-in chains may be provided, the length of the scan-in chains may be reduced, and the faster data may be input.

The digital circuit 502 may include a clock input 506 to receive a clock signal. The clock signal may be received from the off-chip test equipment 550. Scan-in chains received at the inputs may be in a compressed form. Decompression logic may expand data signals received from the input pins. The number of internal data streams available to be extracted from a data signal received from off-chip testing equipment may depend on the number of pins accessible to transfer the data.

Data received through the input pins may be provided to test registers on the digital circuit 502. For example, a first test register 508 may receive a section of scan-in data. Various embodiments may include different numbers of test registers for receiving different numbers of scan-in chains. Multiple test registers may be needed for each scan-in chain because the decompression logic may expand each scan-in chain. The number of scan-in chains available may depend on the number of pins accessible for receiving data from off-chip test equipment (such as an ATE).

The first test register 508 may include flip-flops for storing data received. Different numbers of flip-flops may be used in different embodiments. The number of flip-flops for the test registers may depend on the length of the scan-in chain.

Data may be loaded serially into the test registers. On each cycle of a clock signal (for example, clock signal received at clock input 506), one bit of data may be loaded into each test register. In embodiments with multiple test registers, each register may be serially loaded in parallel. For example, in an embodiment with 1000 test registers, each of the 1000 test registers may be loaded with one bit of data on the first cycle. Additional bits may be loaded and shifted per scan-shift operations. Using the first test register as an example, the first cycle data may be loaded into a first flip-flop 508A of the first test register 508. On a second cycle, data may be shifted to a second flip-flop. Data may remain shifted until an N-th flip-flop 508B of the first test register is filled. Additional test registers may also be loaded simultaneously in the same way.

Once test data is loaded into the test registers, the data stored in the test registers may be used to perform different tests for the digital circuit 502. For example, the data may be used to test for stuck-at faults in the internal logic circuitry. Data from the test registers may be carried to other parts of the digital circuit 502 using internal logic 503. This may be performed using scan load, unload, and capture operations.

The test registers may include input and output shift modes for shifting data and out serially. The test registers may also include parallel in and parallel out modes for loading data in and out of all the flip-flops of a test register in parallel. Once loaded with data from the off-chip testing equipment (such as an ATE), the data from the test registers may output data from the flip-flops in parallel to perform testing operations. The results may be loaded into the test registers when tests are complete. Test-result data may be loaded into the test registers in parallel.

In embodiments, the digital circuit 502 may include a comparator circuit 510. Comparator circuit 510 may be used to compare expected test results for the test operations with the actual test results. The comparator circuit 510 may communicate with the test registers, such as the first test register and any additional test registers, to receive the test result data from the test registers after the test result data has been loaded into the test register.

In various embodiments, compressor logic may compress the data from the test registers before it is provided to the comparator circuit 510. The comparator circuit 510 may thus receive scan-out chains. The test registers may operate in a shift mode to output the test results serially to the compression logic and then to the comparator circuit 510.

The comparator circuit 510 may receive the expected test results from off-chip test equipment. There may be situations where comparing one or more data bits may not be desired. It may be desirable to mask a comparison when there is some uncertainty about data captured for the relevant cycle or the data may not be valid for several reasons. Timing exceptions provide one possible example where this may be the case.

Data input from the off-chip testing equipment (such as an ATE) for comparison with the test results may comprise one of three states: a high state, a low state, or a masked state. As will be readily appreciated, more than one binary pin is needed to carry three states of information for each scan chain.

Using a three-scan-chain embodiment as an example, each of the three scan chains may include a high or low state depending on the expected result or a masked state. The state may be determined by a signal received from the off-chip testing equipment. A signal for three three-state scan chains cannot be carried in one cycle on three pins. Using two pins for each scan chain (i.e., six pins) consumes pin resources that could be used to load scan-in data and expedite test time. The number of pins needed to carry these three states can be reduced by encoding expected result data with the masking data on shared pins.

For example, three scan chains with three possible states yield 27 possible combinations for the three scan chains. This data may be transmitted using a merged expected test result and masking instruction signal using only five pins (rather than six). Decoding logic can then extract the appropriate data or masking signal. And the extra pin may be used for another purpose. The more scan chains, the more advantageous this approach becomes because more pins may be saved for other uses.

The digital circuit 502 may include an input pin 512 and an input pin 514. Expected test results may be loaded on the digital circuit 502 from the input pin 512. In embodiments, additional input and masking pins can be used to input a merged expected test result and masking-instruction signal.

For example, five pins may be utilized to receive a merged expected test result and masking instruction signal. The merged expected test result and masking-instruction signal may be provided to decode logic 516. The decoded expected results may be provided to the comparator circuit 510 for comparison with the actual test results when the expected test results are not masked. As will be appreciated, masking may be accomplished by translating received data in constant value using AND/OR gating.

The results of the comparisons may be outputted at an output port 518. Using a comparator circuit 510 on the digital circuit 502 to perform comparisons of the expected results with the actual test results may reduce the number of output pins needed for output data. This is accomplished using input pins to transmit the expected test-result data onto the digital circuit 502 rather than output pins to transmit the actual results to off-chip testing equipment (such as an ATE).

For example, results from 20 (or more) scan chains may be output by a single output port rather than 20 (or more) output ports. This trade leverages the input pins' speed advantage over the output pins, increasing the overall test-time speed. Using a merged expected test result and masking-instruction signal to transmit data on shared pins frees up additional pins rather than having dedicated pins for masking and expected test results.

Figure 6:
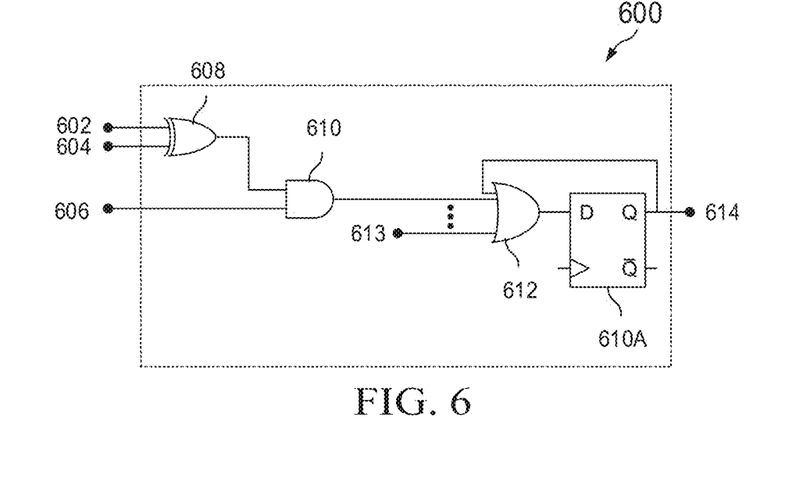
FIG. 6 is a block diagram of an embodiment comparator circuit.

FIG. 6 illustrates a block diagram of an embodiment comparator circuit 600, which may be implemented as the comparator circuit 510. Comparator circuit 600 includes an input 602 to receive test-data results. This may be received directly from test registers. Test data results may be received from compression logic. The number of inputs of the comparator circuit 600 for receiving test data results may correspond to the number of scan chains being compared.

Comparator circuit 600 includes an input 604 to receive decoded expected test results. This may originate from decode logic 516. Comparator circuit 600 can include additional inputs to receive decoded expected results and masking indications for additional comparisons (scan chains).

The test results received at input 602 and the expected result received at input 604 may be provided to an XOR gate 608. The masking indicator received at input 606 may be provided to an AND gate 610 along with an output of the XOR gate 608.

Comparator circuit 600 may include additional XOR gates for receiving expected test results and actual test results from additional scan chains and additional AND gates for receiving additional masking inputs. Results may be aggregated, in various embodiments, for example, with an OR gate 612. An input 611 may carry comparison results from a first scan chain. An input 613, may carry comparison results from an N-th scan chain. This may allow the output of the OR gate 612 to be asserted if expected results from any scan chain deviate from actual test results. Output from the OR gate 612 may be provided to a flip-flop 610A.

In embodiments, the output of the flip-flop 610A may be fed back to the OR gate 612 so that once a deviation is detected, the output may be maintained until the flip-flop is reset. This allows all results to be tracked by a single flip-flop.

Figure 7:
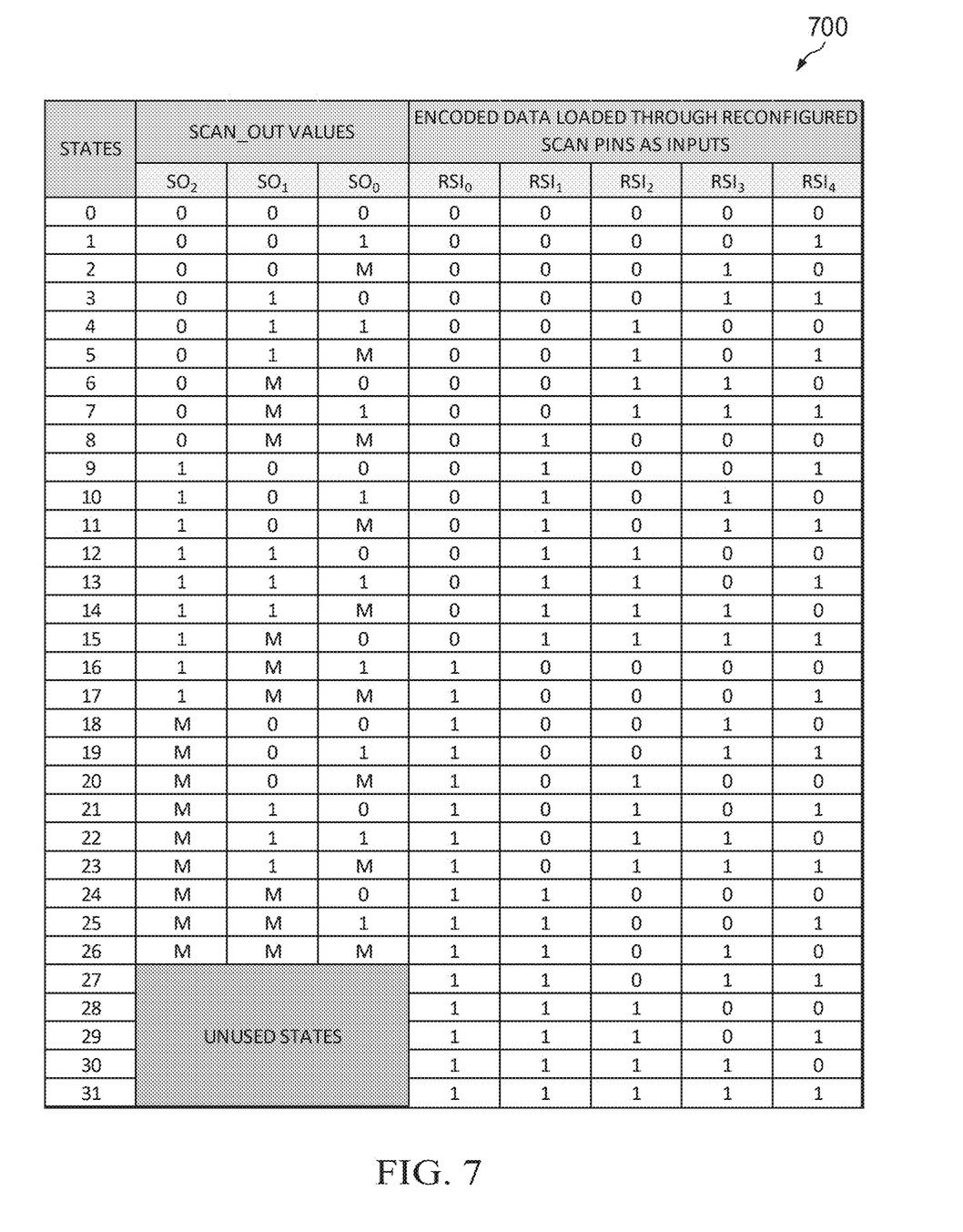
FIG. 7 is an example table mapping five binary input states to data having one of three states.

FIG. 7 illustrates an example table 700 mapping five binary input states to data having one of three states. A typical three-scan chain design includes three input pins and three output pins (i.e., a total of six pins) with 27 states (i.e., $3^3=27$). The scan architecture proposed using the circuits in FIGS. 5 and 6 provides an encoding using five pins to generate the 27 valid states, as the on-chip decoding logic extracts the correct mask and compares bits for each scan chain.

Accordingly, the three-scan chain design using the circuits in FIGS. 5 and 6 is implemented using three scan-in channels and five scan-data channels configured as eight input pins. The encoding and decoding for each cycle are completed without interference across cycles.

The scan-out values of Table 700 may correspond to the decoded outputs from decode logic 516 configured for a design with three scan chains.

For example, $SO_0$ of Table 700 may correspond to the first decoded output of decode logic 516, $SO_1$ of Table 700 may correspond to a second decoded output of decode logic 516, and $SO_2$ of Table 700 may correspond to a third decoded output of decode logic 516.

For illustrative purposes, a '0' may correspond to a low state for an expected test result, a '1' to a high state, and an 'M' to a mask state. The cells for scan pins from Table 700 may correspond to the input pins to the digital circuit.

For example, $RSI_0$ may correspond to a first data input pin, $RSI_1$ to a second data input pin, $RSI_2$ to a third data input pin, $RSI_3$ to a fourth data input pin, and $RSI_4$ to a fifth input pin.

All 27 possible states of the decoded outputs may correspond to one of the thirty-two possible states allowed by five input pins. Various embodiments may use more input pins to provide expected results and masking instructions for more test chains. The number of pins for encoding a merged expected test result and masking-instruction signal may be described by the equation: input pins=$\log_2(3^S)$. Input pins refer to the number of pins for receiving the merged expected test result and masking-instruction signal and S refers to the number of three-state outputs from decoding logic 516, which may equal the number of scan-out chains of test results received from the comparator circuit 600.

In embodiments, more than one output pin may be used for carrying decoded output data that may include one of three states. And, the function ceiling [*] maps the value * to the least integer greater than or equal to *.

For example, where *=4.7, ceiling [*] equals 5. The number of input pins, thus, may depend on the number of three-state outputs desired. Using the equation above, 16 input pins may be used to receive a merged expected test result and masking instruction signal for 10 scan chains. As only 27 states are needed for the exemplary three-scan chain design, the 32 states using the five input pins above (i.e., $2^5$ available states) result in five unused states.

In the case of the single scan chain of FIG. 5, the number of pins is increased from two (i.e., SCAN_IN and SCAN_OUT) to three pins on the input side. Despite this increase in pin count, a significant improvement in shift frequencies is realized by relocating all components to the input side of the circuit. This configuration leverages the quicker performance of the SCAN_IN process compared to the SCAN_OUT, thereby enhancing the overall efficiency and speed of the scanning operation.

Two distinct states characterize the 'scan enable' function within the scan chain design. The first state, or State 1, is active during the shift phase, which is the interval when scan data is fully loaded into the system. Conversely, the second state, or State 0, denotes a period of inactivity for the 'scan in/out' pins when not engaged in data transfer.

In reference to FIG. 7, it is elucidated that any point from State 0 through State 26 represents the shift window. During this time, the 'scan enable' signal is decoded by the decode logic 516 as a logic level high. This is when data is actively being shifted through the scan chain. The sequence then progresses to five states, specifically from State 27 to State 31, previously designated as unused or idle states within the scan operation.

In embodiments, the present disclosure suggests repurposing one of these idle states, for instance, State 27, to serve as an indicator for the capture window. This adaptation would be decoded through decode logic 516, with the 'scan enable' signal being signified as a logic level low during this state. Adopting this strategy permits the same five pins involved in loading the 'scan in' data to concurrently function in extracting the 'scan enable' signal. The key benefit of this configuration is that it successfully eliminates the requirement for dedicated pins exclusively meant for 'scan enable', simplifying the design and potentially reducing associated costs.

More generally, as the $2^N$ number of states will never be a multiple of three ('0' state, '1' state, and 'M' state), the proposed decoding framework will invariably result in a handful of unutilized states.

Figure 8:
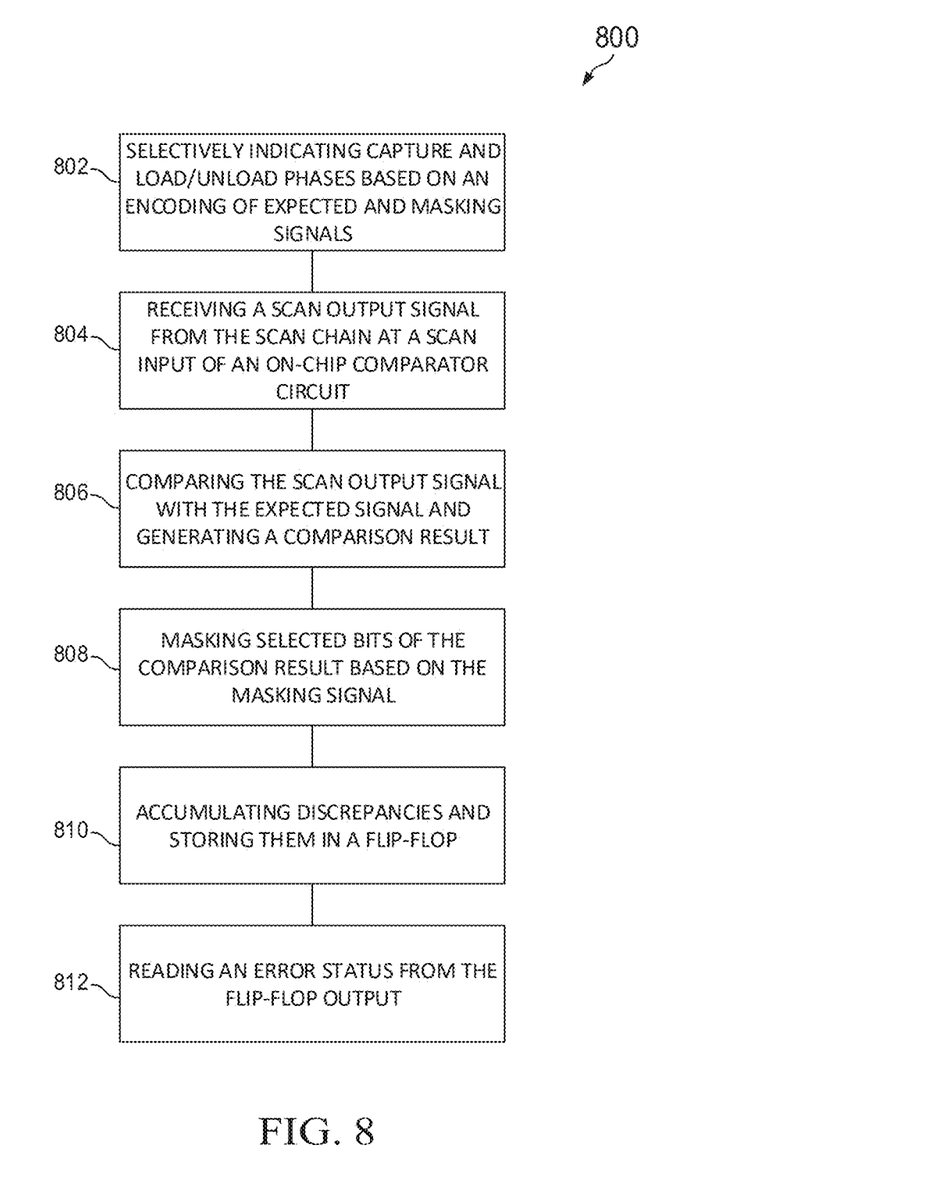
FIG. 8 is a flow chart of an embodiment method.

FIG. 8 illustrates a flow chart of an embodiment method 800. Method 800 may be implemented using, for example, the on-chip comparator circuit 200 coupled to the scan chain 100. Method 800 is implemented without an independent scan enable signal externally provided to the digital circuit under test by a test equipment. In embodiments, an automatic test pattern generating (ATPG) tool runs the tests on the digital circuit.

At step 802, capture or load/unload phases are selectively indicated to the scan chain based on encoding in the expected and masking signals. In embodiments, encoding a high logic level in both the expected signal and the masking signal indicates a load/unload phase, and encoding a low logic level in the expected signal and a high logic level in the masking signal indicates a capture phase. In embodiments, the scan chain is tested over multiple cycles as determined by a test protocol, with the states of the expected signal and the masking signal inputs being variably set according to the test protocol during each cycle.

At step 804, a scan output signal is received from the scan chain at a scan input of the on-chip comparator circuit.

At step 806, the scan input signal is compared, using a XOR gate, against an expected signal to generate a comparison result. In embodiments, a discrepancy is determined when the scan output signal and expected signal differ, indicated by a high logic level result from the XOR gate.

At step 808, selected bits of the comparison result are masked using an AND gate with one inverted input based on a masking signal. In embodiments, the discrepancy is passed through to the OR gate when both inputs to the AND gate indicate a mismatch, with one of them being inverted through the masking signal.

At step 810, discrepancies in an OR gate are accumulated and stored in a flip-flop coupled to the OR gate. The accumulating includes maintaining a high logic level at the output of the OR gate if any discrepancies have been previously stored in the flip-flop.

At step 812, an error status is read from the flip-flop output to determine the digital circuit's functionality. In embodiments, an Internal Joint Test Action Group (IJTAG) interface is used to read out the error status from the flip-flop.

Figure 9:
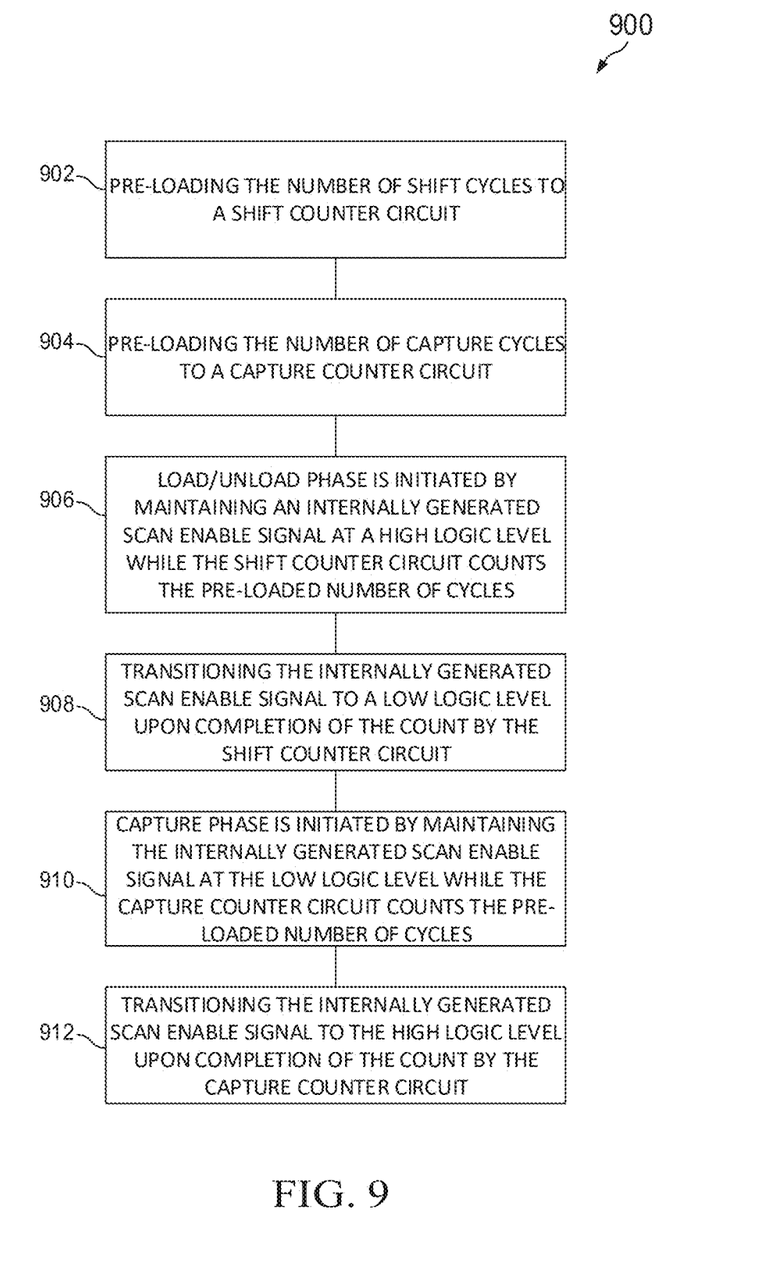
FIG. 9 is a flow chart of an embodiment method.

FIG. 9 illustrates a flow chart of an embodiment method 900. Method 900 may be implemented using, for example, the circuit 400 coupled to the scan chain 100. Method 900 is implemented without an independent scan enable signal externally provided to the digital circuit under test by a test equipment. The method is repeated for multiple iterations corresponding to different segments of a test pattern. In embodiments, an automatic test pattern generating (ATPG) tool runs the tests on the digital circuit.

At step 902, a number of shift cycles corresponding to a test pattern are pre-loaded into a shift counter circuit. In embodiments, the pre-loaded shift cycles are defined based on the test pattern set and loaded into the shift counter circuit using a JTAG interface.

At step 904, a number of capture cycles corresponding to the test pattern are pre-loaded into a capture counter circuit. In embodiments, the pre-loaded capture cycles are defined based on the test pattern set and loaded into the capture counter circuit using the JTAG interface.

At step 906, a load/unload phase is initiated by maintaining an internally generated scan enable signal by a finite state machine circuit at a high logic level, during which the shift counter circuit counts the pre-loaded number of shift cycles. In embodiments, the shift counter circuit implements an up or down count mechanism according to the test pattern specifics.

At step 908, the internally generated scan enable signal transitions to a low logic level after the count by the shift counter circuit. The transition corresponds to a capture phase being initiated. In embodiments, the FSM circuit receives an end-of-count signal from the shift counter circuit, which transitions the FSM circuit from a first state corresponding to the load/unload phase to a second state corresponding to the capture phase.

At step 910, the internally generated scan enable signal is maintained at a low logic level while the capture counter circuit counts the pre-loaded number of capture cycles. In embodiments, the capture counter circuit implements an up or down count mechanism according to the test pattern specifics.

At step 912, the internally generated scan enable signal transitions to the high logic level upon completion of the count by the capture counter circuit to initiate a subsequent load/unload phase. In embodiments, the FSM circuit receives an end-of-count signal from the capture counter circuit, which transitions the FSM circuit from the second state to the first state.

In embodiments, each transition of the internally generated scan enable signal corresponds to a toggle between two states in the FSM circuit. In embodiments, the shift counter and the capture counter circuits employ handshaking features to signal count completion to the FSM circuit to control the logic level transitions of the internally generated scan enable signal. In embodiments, steps 902 through 912 are repeated for each test pattern in a series of test patterns designed to validate the functionality of the digital circuit.

Figure 10:
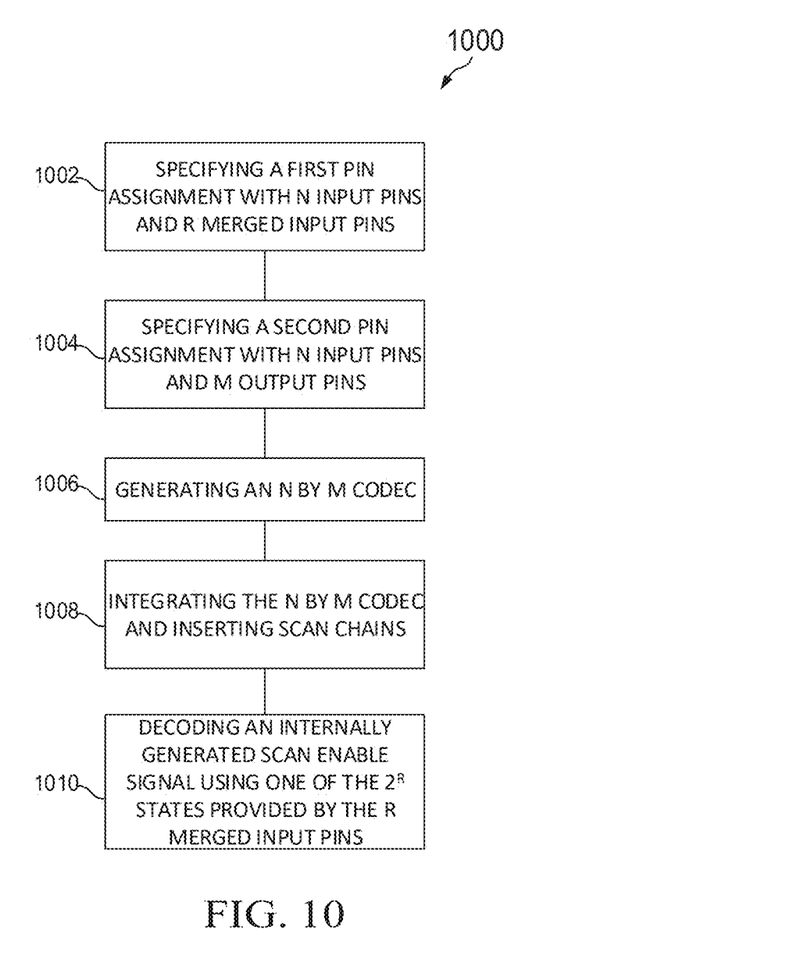
FIG. 10 is a flow chart of an embodiment method.

FIG. 10 illustrates a flow chart of an embodiment method 1000. Method 1000 may be implemented using, for example, the on-chip comparator circuit 500 coupled to the scan chain 100. Method 1000 is implemented without an independent scan enable signal externally provided to the digital circuit under test by a test equipment. In embodiments, an automatic test pattern generating (ATPG) tool runs the tests on the digital circuit.

At step 1002, a first pin assignment with N input pins and R merged input pins is specified. N and R being integers, N corresponding to a number of input pins for carrying scan-in-chain test data, and R corresponding to a number of input pins for carrying a merged expected test result and a masking instruction signal. In embodiments, R equals, or is greater than, $\log_2(3^N)$.

At step 1004, a second pin assignment with N input pins and M output pins is specified. M being an integer and corresponding to a number of output pins for carrying scan-out chain test data. In embodiments, scan-out-chain test data are encoded from M pins and the encoding is mapped to R pin test data.

At step 1006, an N by M codec is generated. In embodiments, pins of the digital circuit are configured into an N by M diagnosis mode to perform tests on the digital circuit.

At step 1008, the N by M codec and inserting scan chains are integrated. The device registers are stitched into multiple scan chains and coupled between a compression circuit and a decompression circuit.

At step 1010, an internally generated scan enable signal is decoded using one of the $2^R$ states provided by the R merged input pins. $3^N$ states are decoded outputs from the decoding logic circuit.

It is noted that all steps outlined in the flow charts of method 800, method 900, and method 1000 are not necessarily required and can be optional. Further, changes to the arrangement of the steps, removal of one or more steps and path connections, and addition of steps and path connections are similarly contemplated.

A first aspect relates to a method for testing using scan chains, without an independent scan enable pin. The method includes selectively indicating a capture phase and a load/unload phase for the scan chain based on an encoding of a scan enable signal in an expected signal and a masking signal; loading test parameters to the scan chain during the load/unload phase; operating the scan chain under functional mode during the capture phase; and generating an error signal based on comparing an output of the scan chain during an unload phase with the expected signal, wherein the masking signal is used to mask the output of the scan chain for cycles with invalid results.

In a first implementation form of the method according to the first aspect as such, the scan chain is tested over multiple cycles as determined by a test protocol. The expected signal and the masking signal are variably set according to the test protocol during each cycle.

In a second implementation form of the method according to the first aspect as such or any preceding implementation form of the first aspect, the method further includes internally generating, by an internal logic circuit, a scan enable signal to operate the scan chain based on the expected signal and the masking signal.

In a third implementation form of the method according to the first aspect as such or any preceding implementation form of the first aspect, encoding a high logic level in the expected signal and the masking signal indicates the load/unload phase. Encoding a low logic level in the expected signal and the high logic level in the masking signal indicates the capture phase.

In a fourth implementation form of the method according to the first aspect as such or any preceding implementation form of the first aspect, the method further includes comparing the output of the scan chain during the unload phase with the expected signal.

In a fifth implementation form of the method according to the first aspect as such or any preceding implementation form of the first aspect, encoding of the scan enable signal in the expected signal and the masking signal comprises determining logic levels of the expected signal and the masking signal and, based thereon, internally generating the scan enable signal.

In a sixth implementation form of the method according to the first aspect as such or any preceding implementation form of the first aspect, the scan chain is coupled to an external test equipment. The method further includes providing a test pattern set to the scan chain without an external scan enable signal.

A second aspect relates to a method for testing using scan chains without an independent scan enable pin. The method includes pre-loading a first number of shift cycles into a shift counter circuit, the first number of shift cycles corresponding to a test pattern set; pre-loading a second number of capture cycles into a capture counter circuit, the second number of capture cycles corresponding to the test pattern set; initiating a load/unload phase of the testing by maintaining an internally generated scan enable signal at a high logic level, wherein the shift counter circuit counts the pre-loaded number of shift cycles; transitioning the internally generated scan enable signal to a logic level in response to a completion of the pre-loaded count by the shift counter circuit, wherein the transitioning initiates a capture phase of the testing; and initiating a subsequent load/unload phase of the testing by transitioning the internally generated scan enable signal to the high logic level in response to a completion of the pre-loaded count by the capture counter circuit.

In a first implementation form of the method according to the second aspect as such, the first number of shift cycles are defined based on the test pattern set and loaded into the shift counter circuit using a JTAG interface.

In a second implementation form of the method according to the second aspect as such or any preceding implementation form of the second aspect, the second number of capture cycles are defined based on the test pattern set and loaded into the capture counter circuit using a JTAG interface.

In a third implementation form of the method according to the second aspect as such or any preceding implementation form of the second aspect, the method further includes implementing an up or down count mechanism in the shift counter circuit according to the test pattern specifics.

In a fourth implementation form of the method according to the second aspect as such or any preceding implementation form of the second aspect, the method further includes implementing an up or down count mechanism in the capture counter circuit according to the test pattern specifics.

In a fifth implementation form of the method according to the second aspect as such or any preceding implementation form of the second aspect, each transition of the internally generated scan enable signal corresponds to a toggle between two states in a finite state machine (FSM) circuit.

In a sixth implementation form of the method according to the second aspect as such or any preceding implementation form of the second aspect, the scan chain is coupled to an external test equipment, the method further comprising providing the test pattern set to the scan chain without an external scan enable signal.

A third aspect relates to a method for testing using scan chains in a digital circuit without an independent scan enable pin. The method includes specifying a first pin assignment with N input pins and R merged input pins, N and R being integers, N corresponding to a number of input pins for carrying scan-in chain test data, and R corresponding to a number of input pins for carrying a merged expected test result and a masking instruction signal; specifying a second pin assignment with N input pins and M output pins, M being an integer and corresponding to a number of output pins for carrying scan-out chain test data; inserting a comparator circuit and a decoding logic circuit into the digital circuit; generating an N by M codec; integrating the N by M codec and inserting scan chains, wherein device registers are stitched into multiple scan chains and coupled between a compression circuit and a decompression circuit; and decoding an internally generated scan enable signal using one of the $2^R$ states provided by the R merged input pins, wherein $3^N$ states are decoded outputs from the decoding logic circuit.

In a first implementation form of the method according to the third aspect as such, the method further includes configuring pins of the digital circuit into an N by M diagnosis mode to perform tests on the digital circuit.

In a second implementation form of the method according to the third aspect as such or any preceding implementation form of the third aspect, an automatic test pattern generating (ATPG) tool runs the tests on the digital circuit.

In a third implementation form of the method according to the third aspect as such or any preceding implementation form of the third aspect, the method further includes encoding scan-out chain test data from M pins and mapping the encoding as R pin test data.

In a fourth implementation form of the method according to the third aspect as such or any preceding implementation form of the third aspect, R equals, or is greater than, $\log_2(3^N)$.

In a fifth implementation form of the method according to the third aspect as such or any preceding implementation form of the third aspect, the scan chains are coupled to an external test equipment, the method further comprising providing a test pattern set to the scan chains without an external scan enable signal.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for testing using scan chains, without an independent scan enable pin, the method comprising:
    selectively indicating a capture phase and a load/unload phase for the scan chain based on an encoding of a scan enable signal in an expected signal and a masking signal;
    loading test parameters to the scan chain during the load/unload phase;
    operating the scan chain under functional mode during the capture phase; and
    generating an error signal based on comparing an output of the scan chain during an unload phase with the expected signal, wherein the masking signal is used to mask the output of the scan chain for cycles with invalid results.

2. The method of claim 1, wherein the scan chain is tested over multiple cycles as determined by a test protocol, wherein the expected signal and the masking signal are variably set according to the test protocol during each cycle.

3. The method of claim 1, further comprising internally generating, by an internal logic circuit, a scan enable signal to operate the scan chain based on the expected signal and the masking signal.

4. The method of claim 1, wherein encoding a high logic level in the expected signal and the masking signal indicates the load/unload phase, and wherein encoding a low logic level in the expected signal and the high logic level in the masking signal indicates the capture phase.

5. The method of claim 1, further comprising comparing the output of the scan chain during the unload phase with the expected signal.

6. The method of claim 1, wherein encoding of the scan enable signal in the expected signal and the masking signal comprises determining logic levels of the expected signal and the masking signal and, based thereon, internally generating the scan enable signal.

7. The method of claim 1, wherein the scan chain is coupled to an external test equipment, the method further comprising providing a test pattern set to the scan chain without an external scan enable signal.

8. A method for testing using scan chains without an independent scan enable pin, the method comprising:
   pre-loading a first number of shift cycles into a shift counter circuit, the first number of shift cycles corresponding to a test pattern set;
   pre-loading a second number of capture cycles into a capture counter circuit, the second number of capture cycles corresponding to the test pattern set;
   initiating a load/unload phase of the testing by maintaining an internally generated scan enable signal at a high logic level, wherein the shift counter circuit counts the pre-loaded number of shift cycles;
   transitioning the internally generated scan enable signal to a logic level in response to a completion of the pre-loaded count by the shift counter circuit, wherein the transitioning initiates a capture phase of the testing; and
   initiating a subsequent load/unload phase of the testing by transitioning the internally generated scan enable signal to the high logic level in response to a completion of the pre-loaded count by the capture counter circuit.

9. The method of claim 8, wherein the first number of shift cycles are defined based on the test pattern set and loaded into the shift counter circuit using a JTAG interface.

10. The method of claim 8, wherein the second number of capture cycles are defined based on the test pattern set and loaded into the capture counter circuit using a JTAG interface.

11. The method of claim 8, further comprising implementing an up or down count mechanism in the shift counter circuit according to the test pattern specifics.

12. The method of claim 8, further comprising implementing an up or down count mechanism in the capture counter circuit according to the test pattern specifics.

13. The method of claim 8, wherein each transition of the internally generated scan enable signal corresponds to a toggle between two states in a finite state machine (FSM) circuit.

14. The method of claim 8, wherein the scan chain is coupled to an external test equipment, the method further comprising providing the test pattern set to the scan chain without an external scan enable signal.

15. A method for testing using scan chains in a digital circuit without an independent scan enable pin, the method comprising:
   specifying a first pin assignment with N input pins and R merged input pins, N and R being integers, N corresponding to a number of input pins for carrying scan-in chain test data, and R corresponding to a number of input pins for carrying a merged expected test result and a masking instruction signal;
   specifying a second pin assignment with N input pins and M output pins, M being an integer and corresponding to a number of output pins for carrying scan-out chain test data;
   inserting a comparator circuit and a decoding logic circuit into the digital circuit;
   generating an N by M codec;
   integrating the N by M codec and inserting scan chains, wherein device registers are stitched into multiple scan chains and coupled between a compression circuit and a decompression circuit; and
   decoding an internally generated scan enable signal using one of the $2^R$ states provided by the R merged input pins, wherein $3^N$ states are decoded outputs from the decoding logic circuit.

16. The method of claim 15, further comprising configuring pins of the digital circuit into an N by M diagnosis mode to perform tests on the digital circuit.

17. The method of claim 15, wherein an automatic test pattern generating (ATPG) tool runs the tests on the digital circuit.

18. The method of claim 15, further comprising encoding scan-out chain test data from M pins and mapping the encoding as R pin test data.

19. The method of claim 15, wherein R equals, or is greater than, $\log_2(3^N)$.

20. The method of claim 15, wherein the scan chains are coupled to an external test equipment, the method further comprising providing a test pattern set to the scan chains without an external scan enable signal.

* * * * *